United States Patent
Mainwaring

[15] 3,663,784
[45] May 16, 1972

[54] NON-TREPANNING NON-ROTARY ELECTRODE FOR ELECTRO-EROSION OF METALS

[72] Inventor: Albert Bruce Mainwaring, Phoenixville, Pa.

[73] Assignee: Uniform Tubes, Inc., Collegeville, Pa.

[22] Filed: Apr. 20, 1970

[21] Appl. No.: 29,876

[52] U.S. Cl. .......................................... 219/69 E, 219/69 D
[51] Int. Cl. ............................................................ B23p 1/08
[58] Field of Search ..................... 219/69 D, 69 E, 69 F, 69 V

[56] References Cited

UNITED STATES PATENTS 2,945,936  7/1960  Carman................................219/69 E Primary Examiner—R. F. Staubly
Attorney—McClure, Weiser & Millman

[57] ABSTRACT

A non-rotary electrode for forming holes in metal workpieces by electro-erosion in which the through bore of passage for the dielectric fluid is spiral and generates a substantially crescent-shaped area when a cross-section is taken through the entire electrode, the maximum transverse depth of the crescent-shaped area extending up to the central axis of the electrode as a maximum so that substantially no build-up of a central plug in the workpiece occurs due to trepanning as the active end of the electrode is consumed in the process. The invention also includes electro-erosion apparatus and an electro-erosion method using the non-trepanning, non-rotary electrode.

11 Claims, 17 Drawing Figures

Patented May 16, 1972

INVENTOR
ALBERT BRUCE MAINWARING
BY
McClure, Weiser & Millman
ATTORNEYS

Patented May 16, 1972

INVENTOR
ALBERT BRUCE MAINWARING
BY
McClure, Weiser & Millman
ATTORNEYS

NON-TREPANNING NON-ROTARY ELECTRODE FOR ELECTRO-EROSION OF METALS

This invention relates to the electro-erosion of metals and more particularly to a non-rotary electrode for use with electro-erosion apparatus.

Electro-erosion of metal workpieces to form blind or through holes therein is conventionally accomplished by applying a series of time-spaced spark discharges between a tubular rotary electrode and a workpiece. A dielectric fluid passes through the axial bore of the electrode to cool the electrode, whose tip or active end is consumed during the erosion process, and to flush out the debris or eroded metal in the annular space formed between the outer diameter of the electrode and the diameter of the hole being formed in the workpiece. The electrode is rotated and fed toward the workpiece as the erosion progresses.

The use of a dielectric fluid passage or bore which is coaxial with the electrode causes the formation by trepanning of a central plug or core in the hole forming in the workpiece which approximates the diameter of the electrode bore. This renders the electro-erosion process inefficient since the plug or core must be subsequently removed, if a blind hole is formed, by mechanical means which are not only time consuming but often difficult to accomplish. In the case of the formation of deep through holes, trepanning inhibits continued electro-erosion.

The prior art has recognized this trepanning problem and has suggested solving the same by the use of a rotary electrode with an eccentric bore. See Dixon et al., U.S. Pat. No. 2,818,490 and Adcock, U.S. Pat. No. 2,902,585. An eccentric bore is one which is offset from the longitudinal axis of the electrode so that its cross-sectional area is located between the central axis of the electrode and a wall of the electrode as shown in FIGS. 4-7 of Dixon et al. Such an eccentric bore necessarily thins the wall of the electrode and is difficult to manufacture efficiently.

Where it is necessary to provide many holes of relatively small diameter or many holes which are closely spaced, as the through holes in turbine blades for the passage of cooling air, it is not possible to use rotary electrodes.

It is the primary object of this invention to provide an electrode which prevents the formation of a central plug by trepanning but which is at the same time non-rotary, so that it can be used efficiently in those applications, as mentioned hereinbefore, where a rotary electrode cannot be used.

Another object is to provide a non-rotary electrode having a bore for the passage of a dielectric fluid of such shape that the build-up by trepanning of a central plug is prevented as the active end or tip of the electrode is consumed in the electro-erosion process.

Another object is to provide a non-rotary electrode of the character described in which the passage for the dielectric fluid is formed in the electrode without thinning the electrode wall and by efficient and economical manufacturing techniques.

These and other objects of the invention will become more apparent as the following description proceeds in conjunction with the accompanying drawings, wherein.

Specific reference is now made to the drawings in which similar reference characters are used for corresponding elements throughout.

Figure 1:
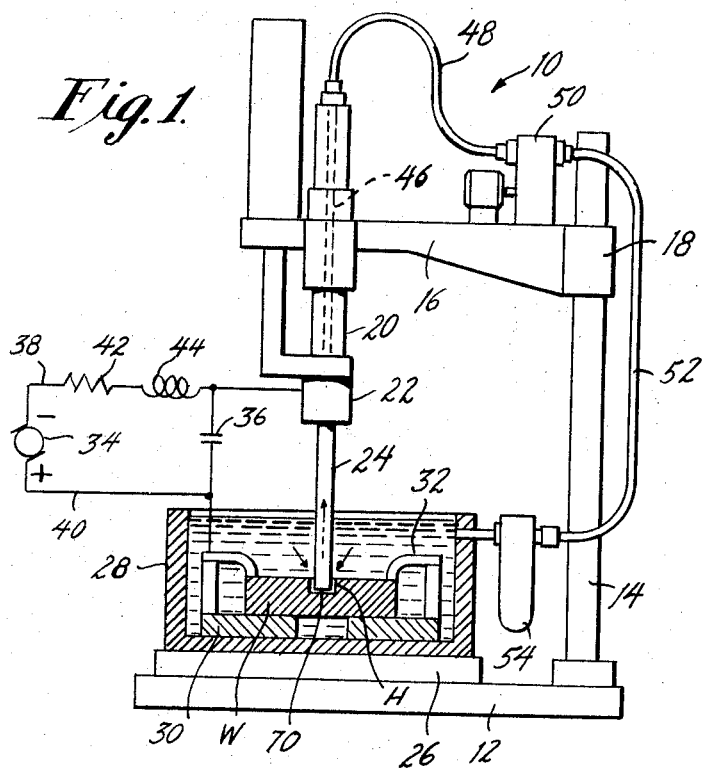
FIG. 1 is an elevational view, partly diagrammatic and partly in section, of an electro-erosion apparatus employing the non-rotary electrode of the instant invention.
Figure 2:
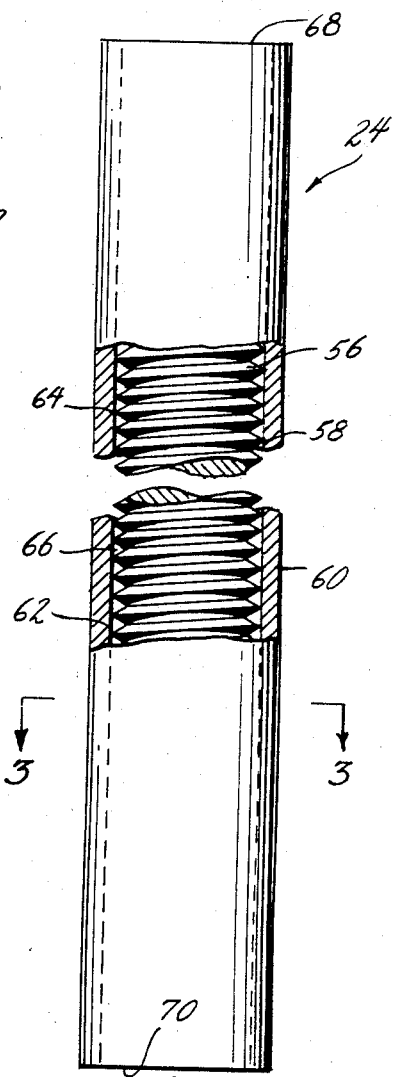
FIG. 2 is an elevational view, partly broken away and in section, of one form of non-rotary electrode.
Figures 4, 5:
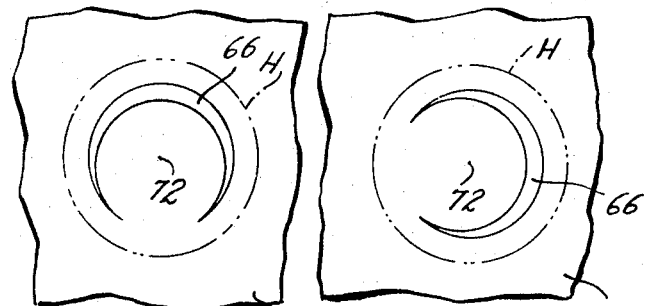
FIGS. 4-7 are diagrammatic views of the active end or tip of the electrode showing the dielectric fluid passage at the 12, 3, 6, and 9 o'clock positions as the active end of the electrode is consumed during the electro-erosion process.
Figures 6, 7:
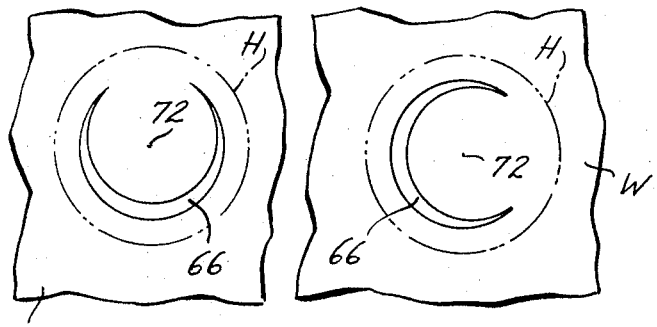

Referring first to FIG. 1 and the electro-erosion apparatus 10 shown therein, it comprises a mechanical and an electrical unit. The mechanical unit includes a base 12 upon which an upright post 14 is mounted which carries a lateral arm 16 which is vertically adjustable by means of a clamp 18. The arm 16 carries a spindle 20 whose lower end is equipped with a chuck 22 for removably retaining the upper shank or inoperative end of the electrode 24 of the instant invention.

Mounted on the base 12 over an insulating pad 26 is a dielectric fluid container 28 which is equipped with a mounting block 30 having dogs 32 which secure the workpiece W.

A variety of electrical circuits may be utilized to supply spark discharges between the operative end of the electrode 24 and the workpiece W. For illustrative purposes the circuit shown in FIG. 1 comprises a direct current source 34 and a condenser 36 which is charged from the source via conductors 38 and 40 which include a resistor 42 and an inductance 44. The conductor 38 from the negative side of the source is connected to the chuck 22 while the conductor 40 from the positive side is connected to workpiece holder 32.

The spindle 20 is non-rotary and can be raised and lowered or infed towards the workpiece W to maintain an appropriate spark gap by raising and lowering the arm 16 or by raising or lowering the spindle itself using means as is conventionally employed in a drill press.

To circulate dielectric fluid through the passage in the electrode to cool the same and remove dislodged particles from the workpiece, the spindle 20 is provided with a bore 46 which communicates with the electrode passage and which is connected via a conduit 48 with the suction side of a pump 50, the delivery side of which is connected via a conduit 52 and a filter unit 54 to the container 28.

The electrode 24 comprises an inner solid member 56 in the form of a bolt which is substantially cylindrical and is provided with an external spiral or helical thread 58. The inner threaded member 56 is encased and retained in an outer substantially cylindrical sleeve 60 so that the inner surface 62 thereof abuts the crests 64 of the thread 58 thereby forming an enclosed spiral or helical passage 66 for the dielectric fluid.

While, for the sake of simplicity and ease of manufacture, the entire length of the electrode is comprised of the inner threaded member 56 and the outer sleeve 60 with the spiral or helical passage 64 extending through the length of the electrode from its inoperative upper end 68, which is non-rotatably mounted in the chuck 22, to its lower operative or active end 70, it is understood that the spiral or helical passage 66 can be confined to a reasonable length at the active end 70, in which case the inner member can terminate short of the upper end 68 of the electrode, which end will thus consist only of the outer sleeve. In other words, the inner member 56 need not be coextensive with the outer sleeve 60, or it can be coextensive with the outer sleeve, or it can be coextensive with the outer sleeve but its thread 58 can terminate short of the upper end 68 of the sleeve and the portion beyond the thread can be of reduced diameter to permit passage of the dielectric fluid through the passage 66 and the upper end of the electrode.

In use during the electro-erosion in which the electrode is not rotated but simply infed towards the workpiece W to maintain a desired spark gap, a hole H is formed while the active end 70 of the electrode is consumed. During such consumption, as shown in FIGS. 4-7, the position of the spiral or helical passage 66 around the central axis 72 of the electrode is ever changing, as if the electrode were in fact rotated, so that the passage 66 traverses the central portion of the workpiece hole to militate against the formation of a central plug due to trepanning.

Figure 3:
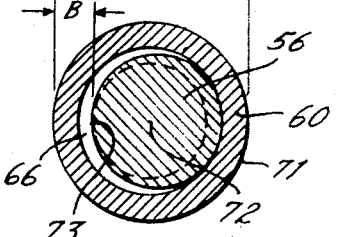
FIG. 3 is a sectional view taken on the line 3—3 of FIG. 2.

It will be understood, of course, that the depth and the pitch of the thread 58 of the inner member 56 can be varied. However, to prevent trepanning a certain relationship between the depth of the passage 66 formed and the central axis 72 must be maintained. It will be seen, particularly in FIG. 3, that when a cross-section is taken through the entire electrode, i.e., bolt and sleeve, the spiral thread 58 generates a passage 66 which is substantially crescent-shaped in cross-section. The greatest transverse depth of the passage, represented by B in FIG. 3, cannot extend beyond the central axis 72, or stated another way, the distance B between the outer surface 71 of the sleeve and the centering point or node 73 of the passage 66 must be equal to or less than one-half that of the outer diameter A of the sleeve.

Figures 8, 9:
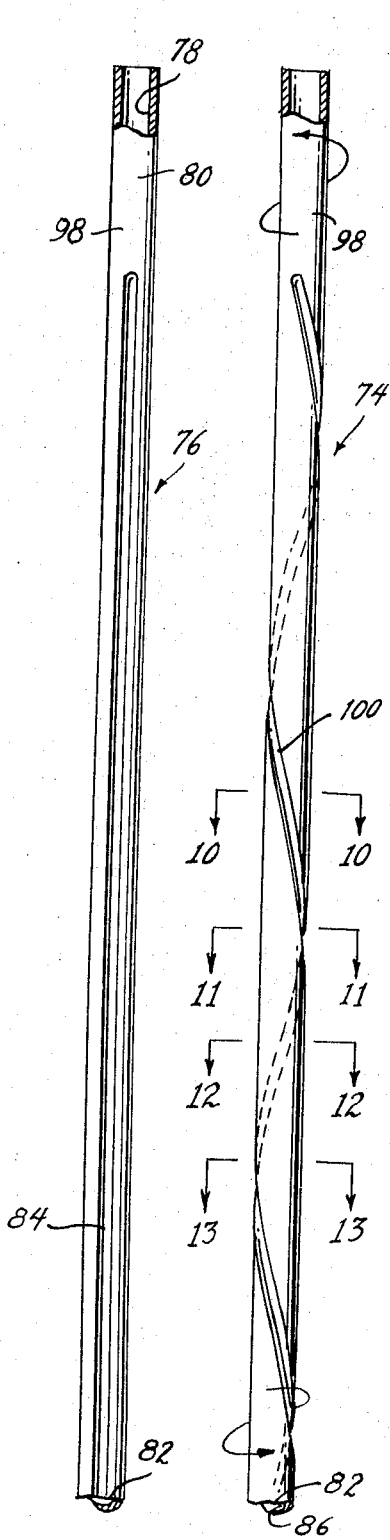
FIG. 8 is an elevational view of the precursor for another form of the non-rotary electrode.
FIG. 9 is a view similar to FIG. 8 showing the final form of the electrode after a torque has been applied to the ends of the precursor unit shown in FIG. 8.
Figure 10:
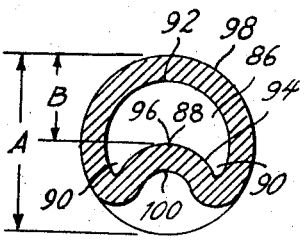
FIG. 10 is a sectional view taken on the line 10—10 of FIG. 9.
Figure 11:
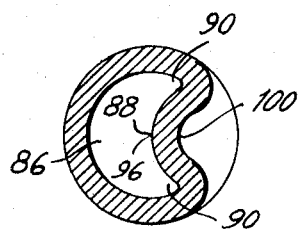
FIG. 11 is a sectional view taken on the line 11—11 of FIG. 9.
Figure 12:
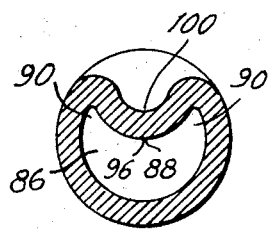
FIG. 12 is a sectional view taken on the line 12—12 of FIG. 9.
Figure 13:
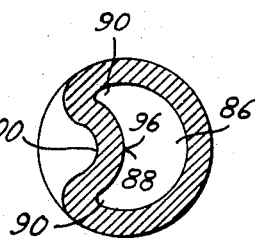
FIG. 13 is a sectional view taken on the line 13—13 of FIG. 9.
Figure 14:
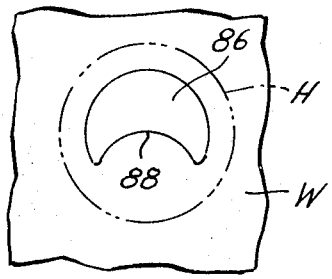
FIGS. 14-17 are diagrammatic views illustrating the 12, 9, 6 and 3 o'clock positions of the dielectric fluid passage as the active end of the electrode is consumed during the electro-erosion process.
Figure 15:
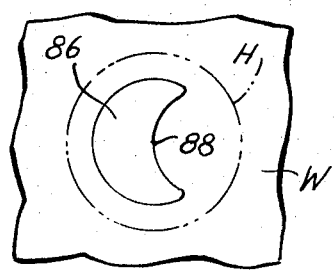
Figure 16:
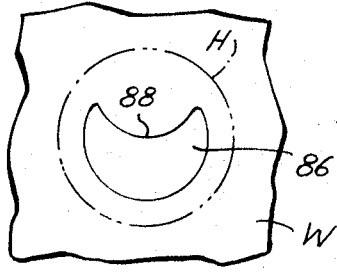
Figure 17:
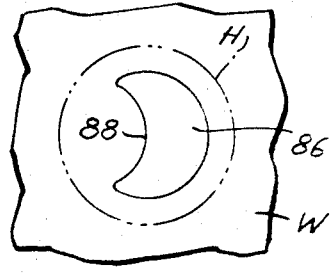

Coming now to the form of the invention shown in FIGS. 8-17, the electrode is generally shown at 74, FIG. 9, which is made from the precursor unit 76, FIG. 8. The precursor unit is a substantially cylindrical tubular member having an inner substantially uniform bore 78 at its upper or inactive end 80 which will be mounted nonrotatably in the chuck 22. This bore 78 had originally extended throughout the length of the electrode to its active end or tip 82, but upon providing a crease or indentation 84 in the wall thereof at a predetermined area for the major length thereof, the cylindrical bore 78, at the area of the indentation, is distorted to a bore 86 which is crescent-shaped in cross-section and symmetrical relative to the central axis 88 of the electrode providing cusps 90 beyond the central axis on both sides thereof into the area of the electrode diametrically opposite that in which the main or non-cusp portion of the bore is located. Thus, it will be seen that the crescent-shaped bore provides an inner wall surface, the outer portion 92 of which is larger and generally circumferentially extending while the inner portion 94 is shorter, reverse curved and generally radially extending, thus forming the cusps. Preferably the centering point or node 96 of the reverse curved portion 94 is substantially coincident with the central axis 88 of the electrode. However, to prevent any formation of a central plug or core by trepanning, the radial distance B from the outer wall surface 98 to the node 96, as seen in FIG. 10, must be equal to or less than one-half A, the outer diameter of the electrode.

A torque or twist is applied to the ends of the unit 74 as shown by the arrows in FIG. 9 with the result that the crease or indentation 84 takes a spiral form 100 as does the crescent-shaped bore 86, so that, as seen in FIGS. 10-13, the positions of the spiral bore and indentation relative to the central axis 88 of the electrode vary along the length of the electrode.

In use when the inactive end 80 of the electrode is non-rotatably mounted in the chuck 22 and the electrode is infed to the workpiece to maintain a desired spark gap, a hole H is formed by electro-erosion while the active end of the electrode is consumed. In so doing, as will be seen in FIGS. 14-17, the position of the bore 86 through which the dielectric fluid passes changes relative to the central axis 88 of the electrode so that the bore traverses or eclipses the central portion of the hole H forming in the workpiece, thereby preventing build-up of a central plug due to trepanning, as if the electrode were actually rotated.

It is to be understood that while the form of the electrode 74 shown is preferred because of the ease and economy of manufacturing the same, the crescent-shaped bore may be embodied in a member without an external indentation or crease 100, and the electrode need not be circular in cross-section but can be square, rectangular, etc. In the case of an electrode whose external shape is non-circular, the distance B would be equal to or less than one-half the diameter of the circle whose radius is that from the central axis 88 to the high point of the non-circular shape.

While preferred embodiments of the invention have here been shown and described, it will be understood that minor variations may be made without departing from the spirit of the invention.

I claim:

1. A non-rotary electrode for forming holes in metal workpieces by electro-erosion comprising an elongated member having an inactive end adapted for connection to electro-erosion apparatus and an opposed active end and an internal through passage for dielectric fluid in said member from the inactive to the active end, said passage at least at the active end being spiral and generating a substantially crescent-shaped area when a cross-section is taken through the entire member, the maximum transverse depth of said crescent-shaped area extending up to the central axis of said member as a maximum so that substantially no build-up of a central plug due to trepanning will occur as the active end of the electrode is consumed.

2. The electrode of claim 1 wherein said member comprises an outer sleeve and an inner solid member secured therein having an external spiral thread whose crests abut the inner surface of said sleeve to form therewith said spiral dielectric fluid passage.

3. The electrode of claim 2 wherein said inner member is coextensive with said outer sleeve.

4. The electrode of claim 1 wherein said member is tubular, the through bore of which is spiral and substantially crescent-shaped in cross-section at least at the active end of said member forming cusps which extend beyond the central axis of said member.

5. The electrode of claim 4 wherein said crescent-shaped spiral bore extends for the major length of said member.

6. The electrode of claim 4 wherein said crescent-shaped spiral bore is formed of a longer outer generally circumferentially extending curved surface and a shorter inner reverse curved, generally radially extending surface having a node, the radial distance from the outer surface of the member to the node being equal to or less than the outer diameter of the member.

7. The electrode of claim 6 wherein the wall of said member is radially indented and extends spirally therealong thereby forming said shorter inner reverse curved surface.

8. Electro-erosion apparatus comprising a hollow non-rotary spindle, means to raise and lower said spindle, means to circulate dielectric fluid through said spindle, an electrode, means to removably secure said electrode to said spindle, a workpiece holder, and means applying a direct current between said electrode securing means and said workpiece holder to provide an erosion spark between the active end of said electrode and the workpiece, said electrode being an elongated member having an internal through passage therein for the dielectric fluid, said passage at least at the active end being spiral and generating a substantially crescent-shaped area when a cross-section is taken through the entire member, the maximum transverse depth of said crescent-shaped area extending up to the central axis of said member as a maximum so that substantially no build-up of a central plug due to trepanning will occur as the active end of the electrode is consumed.

9. The combination of claim 8 wherein said member comprises an outer sleeve and an inner solid member secured therein having an external spiral thread whose crests abut the inner surface of said sleeve to form therewith said spiral dielectric fluid passage.

10. The combination of claim 8 wherein said member is tubular, the through bore of which is spiral and substantially crescent-shaped in cross-section at least at the active end of said member forming cusps which extend beyond the central axis of said member.

11. A method of forming holes in workpieces by electro-erosion comprising non-rotatably retaining an electrode with its active end spaced from a workpiece, applying a direct current between the electrode and the workpiece to produce erosion sparks between the active end of the electrode and the workpiece, circulating dielectric fluid through the electrode and around the hole forming in the workpiece, and providing an internal spiral passage in the electrode for the dielectric fluid which generates a substantially crescent-shaped area when a cross-section is taken through the entire electrode, the maximum transverse depth of said crescent-shaped area extending up to the central axis of the electrode as a maximum so that substantially no build-up of a central plug due to trepanning will occur as the active end of the electrode is consumed.

* * * * *